United States Patent [19]

Messner

[11] Patent Number: 5,358,164
[45] Date of Patent: Oct. 25, 1994

[54] DRIVE APPARATUS FOR A DRIVING OF AT LEAST ONE OSCILLATING SHAFT AND AN INTERMITTENT FEEDING APPARATUS INCLUDING THE DRIVE APPARATUS

[75] Inventor: Helmut Messner, Arbon, Switzerland

[73] Assignee: Bruderer AG, Frasnacht, Switzerland

[21] Appl. No.: 987,547

[22] Filed: Dec. 7, 1992

Related U.S. Application Data

[63] Continuation of Ser. No. 728,793, Jul. 8, 1991, abandoned, which is a continuation of Ser. No. 426,733, Oct. 24, 1989, abandoned.

[30] Foreign Application Priority Data

Oct. 26, 1988 [CH] Switzerland ............... 3980/88-4

[51] Int. Cl.⁵ .............................................. B21D 43/09
[52] U.S. Cl. .......................................... 226/142; 74/52; 226/156
[58] Field of Search ........ 226/147, 152, 154, 156–158, 226/162, 165, 142; 74/96, 52, 104, 834, 384

[56] References Cited

U.S. PATENT DOCUMENTS

| | | | |
|---|---|---|---|
| 1,877,819 | 9/1932 | Coryel | 226/150 |
| 2,699,119 | 1/1955 | Healy | 74/834 |
| 2,961,234 | 11/1910 | Munro | 74/104 X |
| 3,758,011 | 9/1973 | Portmann | 226/142 |
| 3,784,075 | 1/1974 | Portmann | 226/143 |
| 4,234,107 | 11/1980 | Gernlein | 74/834 X |
| 4,245,516 | 1/1981 | Day | 74/52 |
| 4,271,711 | 6/1981 | Vavra | 74/96 |
| 4,561,582 | 12/1985 | Wiig | 226/142 |
| 4,702,428 | 10/1987 | Kempster | 74/834 X |
| 4,796,477 | 1/1989 | Brems | 74/52 |

Primary Examiner—Daniel P. Stodola
Attorney, Agent, or Firm—Ladas & Parry

[57] ABSTRACT

The lever of a mechanism for driving a sheet feeder is guided for linear longitudinal movement in a guide member. The guide member is supported rotatably in a bearing pedestal, which is height adjustable. The lower section of the lever is shaped as a hollow profile having inner sliding surfaces. A slide member is located at the sliding surfaces. The slide member receives a pivot, by which a shaft is driven oscillatingly. The slide member is located for longitudinal movement at the center axis of the lever and, accordingly, the lever is not subjected to any torsional loadings and the entire apparatus can be made relatively narrow. This decreases elongations during the operation of the apparatus considerably.

15 Claims, 7 Drawing Sheets

DRIVE APPARATUS FOR A DRIVING OF AT LEAST ONE OSCILLATING SHAFT AND AN INTERMITTENT FEEDING APPARATUS INCLUDING THE DRIVE APPARATUS

This is a continuation of copending application(s) Ser. No. 7/728,793 filed on Jul. 8, 1991 now abandoned which is a continuation application of Ser. No.: 07/426,733 filed Oct. 24, 1989 (now abandoned).

BACKGROUND OF THE INVENTION

1. Field of the Invention

The present invention relates to a drive apparatus for oscillating at least one shaft, the drive apparatus including a lever which is pivotable around a pivot axis and coupled to a drive member which is reciprocable between two end positions. The invention relates further to an apparatus for intermittently feeding a web-shaped workpiece, the apparatus having a pressing roller, a feeding unit cooperating with the pressing roller, and the drive apparatus 2. Description of the Prior Art A drive apparatus for oscillating shafts and an application of this drive apparatus for driving two counter-rotating oscillating feed rollers of an apparatus for intermittently feeding workpieces are disclosed in the U.S. Pat. Nos. 3,758,011 and 3,784,075.

The disclosed apparatus includes a lever which is pivotable around a pivot axis. The lever is mounted to a drive member which is reciprocable between two end positions and includes a rotatably mounted sliding body, which is guided at a slideway included with a rotating member mounted to the shaft to be driven.

The lever of this known apparatus is subjected, among other things, to a rather high torsional loading. The known apparatus features, furthermore, a considerable width. This leads to rather long structural members that are subjected to bending forces, and as well known, that designs having long structural members subjected to bending forces lead to imprecise operation and imprecise products.

SUMMARY OF THE INVENTION

It is, therefore, a general object of the invention to provide a drive apparatus for oscillating at least one shaft in which the length of its members is reduced to decrease deflections due to bending loadings.

A further object of the present invention is to provide a drive apparatus for oscillating at least one shaft having a lever which is a structured member having a hollow profile having inner sliding surfaces, a slide body guided in the hollow profile, and the pivot of a crank received in the slide body.

Yet a further object of the invention is to provide an apparatus for intermittently feeding a web-shaped workpiece which is combined with the above-mentioned drive apparatus and in which at least a feeding unit is coupled to the crank and the distance between a pivot axis for the lever and the axis of the pivot of the crank is adjustable for selecting the extent of the feed of at least the feeding unit.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
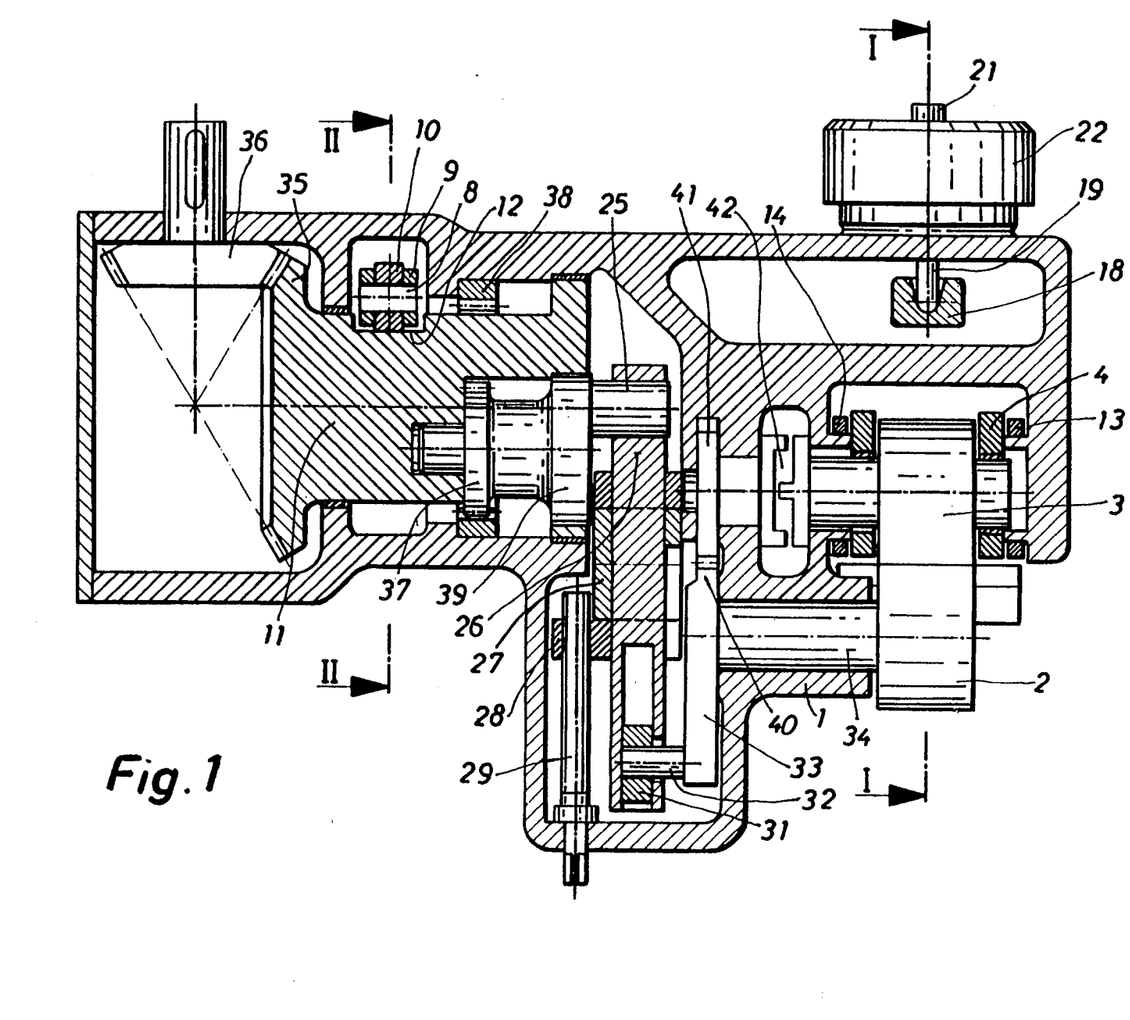
FIG. 1 is a sectional view of a first embodiment of a feeding apparatus.
Figure 2:
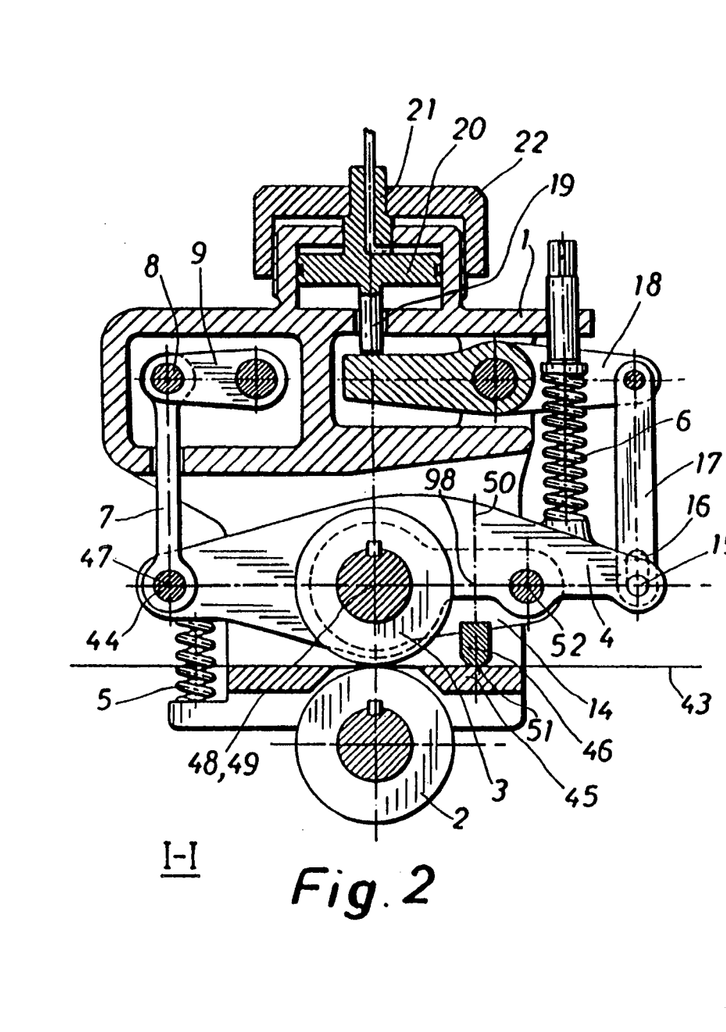
FIG. 2 is a section along line 2—2 in FIG. 1.
Figure 3:
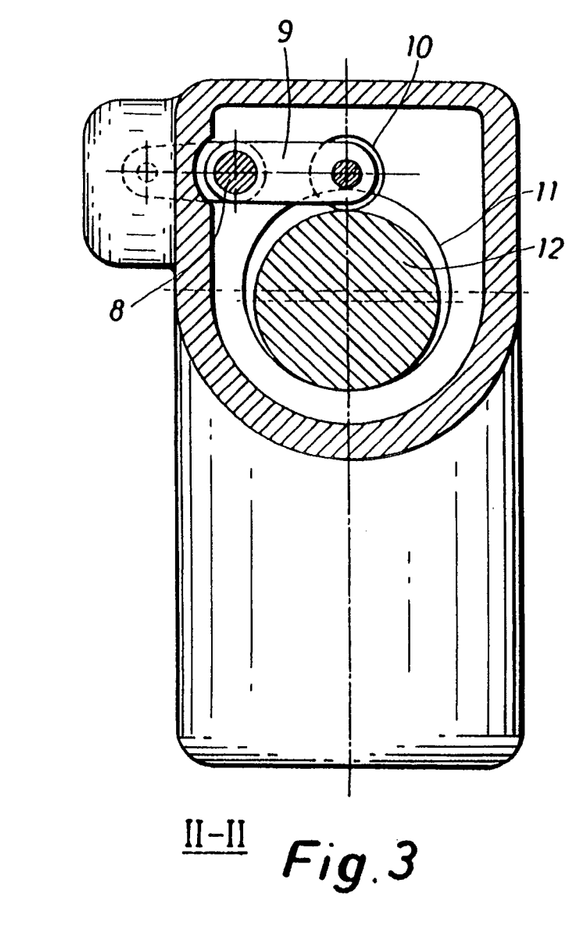
FIG. 3 is a section along line 2—2 in FIG. 1.

Each preferred embodiment for intermittently feeding a web-shaped workpiece, for instance, sheet metal includes a casing 1. An oscillating feeding unit which is constituted by a lower feeding roller 2 is supported in this casing 1. An adjustably pressing, driven feeding roller 3 is located adjacent to the lower feeding roller 2. The two feeding rollers 2 and 3 of this embodiment are driven to rotate in opposite senses relative to each other by structures explained in detail further below. The upper feeding roller 3 is supported rotatably at both its ends in a rocker 4, which rocker 4 is supported at both sides of the upper feeding roller 3 via springs 5 and 6, respectively, on the casing 1. At the end of the rocker 4 which is supported on the spring 5, the rocker 4 is hingedly mounted via a link member (a rod) 7 and a shaft 8 to one end of a lever 9, which lever carries at its opposite, free end a rotatably supported roller 10. This roller 10 cooperates with a cam member 12 located on a drive shaft 11. The drive of this drive shaft 11 is coupled to the drive of the two feeding rollers 2 and 3 and will be explained in detail further below. A pair of arms 13, 14 are hingedly mounted to the rocker 4, which arms are hingedly mounted at their opposite ends to the casing 1. A pressing bar 46 is inserted between the two arms of this pair of arms 13, 14.

The rocker 4 comprises at its end which is supported on the spring 6 a pin 15, which is received in an oblong hole 16 of a supporting member 17. This supporting member 17 is pivotably mounted to a double lever 18, which is acted upon by the piston rod 19 of a piston 20. A pin 21 is, furthermore, mounted to mentioned piston 20, which pin 21 cooperates with an adjusting nut 22 which engages threadingly the casing 1.

Figure 4:
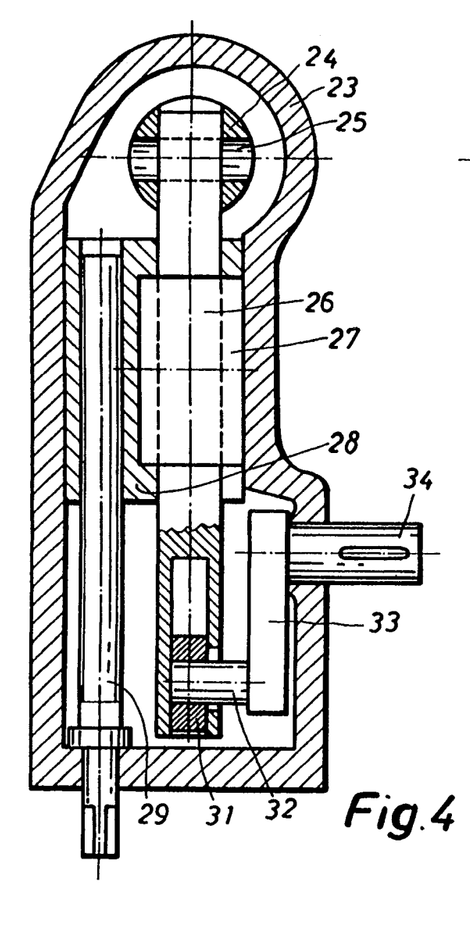
FIGS. 4 and 5 illustrate an apparatus for an oscillating driving of at least one shaft.
Figures 4A, 5:
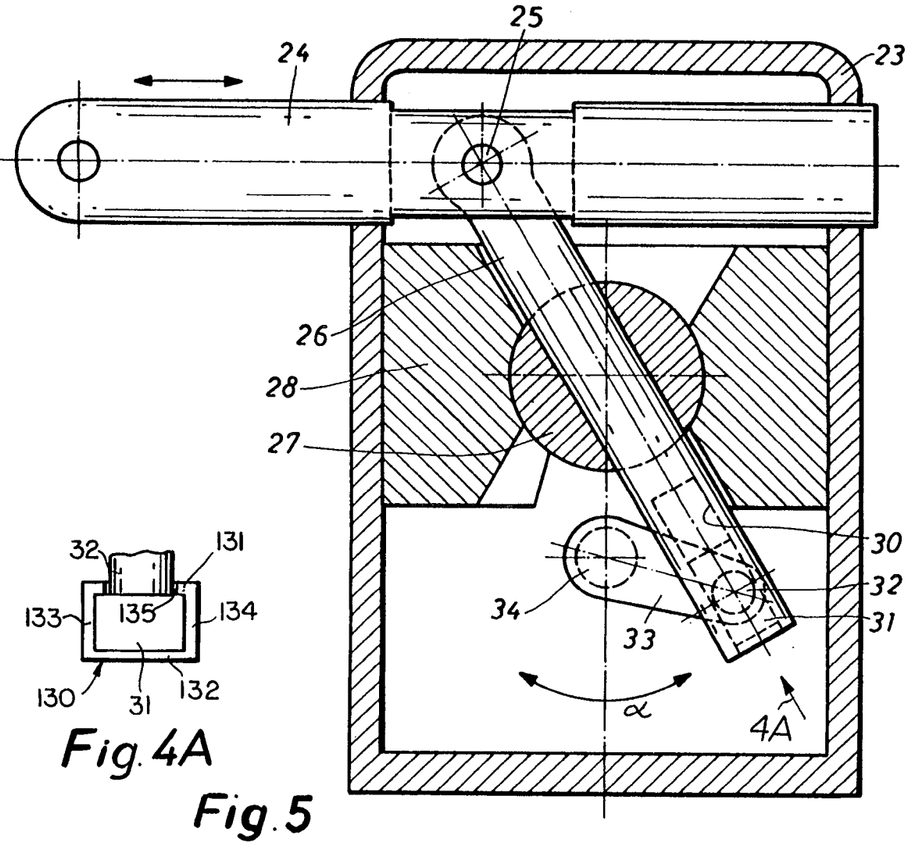
FIG. 4A is an end view taken in the direction of arrow 4A in FIG. 5.

Based on FIGS. 4 and 5 the operation of the drive for an oscillating driving of at least one shaft will now be explained.

A rod 24 supported for longitudinal movement in a casing 23 is reciprocally moved, for instance, by means of a crank drive, which rod 24 drives a lever 26 which is pivotably mounted thereto via a pivot pin 25. This lever 26 is guided in a drum shaped guide member 27, which is supported in concentric, cylindrical surfaces of a bearing pedestal 28 having an inner thread. The bearing pedestal 28 has opposite, flat surfaces which slidably engage the casing 23 so that the pedestal is slidably guided without rotating within the casing 23 and a threaded spindle 29 extends through the threads of the pedestal. When the threaded spindle 29 is rotated, the bearing pedestal 28 shifts its location together with the guide member 27 such that the location of the center of rotation of the lever 26 can be adjusted or changed, respectively. The cylindrical surfaces of pedestal 28 which support the guide member 27 are in substantially coplanar alignment with pivotable lever 27 as shown in FIG. 4.

The lever 26 is designed as a hollow profile having an axis and transversely, circumferentially continuous sliding or gliding surfaces 30 located therewithin, in which gliding surfaces 30 a slide body for axial 31 is supported sliding. As seen in FIG. 4A, the hollow profile of the lever 26 is obtained by forming the lever with a tubular end portion 130 having a top wall 131, a bottom wall 132 and opposite side walls 133 and 134. The slide body 31 fits into the interior of the tubular end portion 130 and the top, bottom and side surfaces of the slide body 31 slidably contact the corresponding surfaces of the walls of the tubular end portion of the lever. The pivot 32 of a crank 33 extends through a slot 135 in the top wall 131 and pivotably engages the slide ring 31. The crank 33 is connected to the oscillatingly driven shaft 34.

If now the rod 24 is reciprocated the lever 26 is rotated reciprocatingly, whereby the axis of the drum shaped guide member 27 is the axis of rotation of this movement. The pivoting movement of the end of the lever 26 is transmitted via the slide body 31 and the pivot 32 supported therein via the crank 33 onto the shaft 34 to be driven such that now this shaft 34 is oscillatingly driven.

If the threaded spindle 29 is rotated, the axis of rotation of the lever 26 can be adjusted, such that accordingly the magnitude of the deflection of the end of the lever 26 which supports the slide body 31 can be adjusted and accordingly the amplitude of the oscillating movement of the shaft 34 can be adjusted.

It is, thereby, of decisive importance, that the translatory movement of the longitudinally movable supported rod 24 and the movement of the pivot pin 25 are always the same independently of the deflection of the lever 26 and that the pivot pin 25 will always be in the same end positions, in which it reverses the direction of movement.

The drum shaped guide member 27 is inserted rotatably in the bearing pedestal 28 such that the geometric center of the drum shaped guide member 27 is located on the center axis of the lever 26. By means of this design and because the slide body 31 is translatorically movably supported in the lever 26, the lever 26 is not subjected to torsional loadings, but rather only to bending loadings, such that a much smaller inner flexibility or yielding effect, respectively, of the apparatus is achieved. Furthermore, it is now also possible to design the casing 23 rather narrow such that a saving on space is achieved.

Based on the FIGS. 1-3 it now will be described how the principle of the driving as explained above is applied for the driving of the exemplary two feeding rollers 2 and 3. The drive shaft 11 supports at one of its ends a gear wheel 35, which meshes with a drive gear wheel 36 of a not particularly designed main drive. A gear wheel 37 is eccentrically supported in the drive shaft 11. This gear wheel 37 rolls along a gear ring 38 having an inner toothing which is inserted in the casing 1. The gear wheel 37 is rigidly connected to a disk 39, which supports an eccentrically located pivot pin 25, which pin is illustrated in FIGS. 1 and 4-6. This pivot pin 25 is mounted to the lever 26, in which the slide body 31 is located and in which the pivot 32 of the crank 33 is received, via which crank 33 the shaft 34 which is to be driven is driven oscillatingly. By means of the threaded spindle 29 the bearing pedestal 28, in which the drum shaped guide member 27 is supported, is screwed upwards or downwards, depending on the amplitude having been selected. The crank 33 includes a toothed segment 40, which meshes with a toothed segment of a disk or rocker arm 41, respectively. Via a suitable clutch 42 the oscillating movement of mentioned disk or rocker arm 41, respectively, is transmitted to the upper feeding roller 3.

By the above structure the two feeding rollers 2 and 3 are oscillatingly driven in a contrarotating fashion.

The intermittent stepwise feeding of a workpiece, for instance, of a sheet metal web 43, which is located between the two feeding rollers 2 and 3, will now be described in detail. As already mentioned above, the drive shaft 11 includes a cam member 12 which in this embodiment is an integral part of the drive shaft 11. When the drive shaft 11 rotates, the roller 10 moves in an oscillating manner, which movement is transmitted via the lever 9, the shaft 8 located at the side thereof onto the rod 7 which is now oscillated accordingly. The rod 7 is pivotably mounted via the pin 47 to the rocker 4.

If now the rod 7 is moved downwards, it urges the rocker 4 against the force of the spring downwards. Due to the force exerted by the rod 7 onto the end of the rocker 4 supported on the spring 5 the rocker 4 is pivoted downwards around the pin 15 towards the sheet metal web 43. The upper feeding roller 3 is thereby pressed against the lower stationary supported feeding roller 2. The rod 7 continues to move downwards and due to this further movement the bite between the feeding rollers 2 and 3 becomes now the center of rotation of the rocker 4 such that conclusively the pressing bar 46 is lifted off. The rod 7 continues its downward movement such that the rocker 4 is now rotated or pivoted, respectively, around the mentioned center of rotation such that now the pin 15 is translatorically moved in the oblong hole 16. The two feeding rollers 2 and 3, which rotate during this period in the direction of workpiece feed, contact the sheet metal web 43 and advance the web (in the illustration of FIG. 2 towards the left hand side). Now the rod 7 begins to move upwards. The springs 5 and 6 cause thus a pivoting of the rocker 4 around the axis of the feeding roller 3, such that accordingly the pressing bar 46 is lowered again and clamps the sheet metal web 43 against an abutment 45 such that the web is arrested. After the clamping of the sheet metal web 43 the upper feeding roller 3 is lifted off. Accordingly the two feeding rollers 2 and 3 no longer act onto the sheet metal web 43 and make during the rotating of the drive shaft 11 a movement opposite the direction of feed.

Due to the illustrated structure it is no longer necessary to effect at the rocker any special measures for coping with various thicknesses of a respective sheet metal web 43 being fed.

The extent or distance, specifically of the feeding steps, is adjusted by an adjusting of the amplitude of the oscillating movement of the feeding rollers, i.e. such as mentioned above, by a translatory moving of the bearing pedestal 28 along the threaded spindle 29.

In order to initially insert the sheet metal web 43 to be fed the piston 20 is lowered and accordingly the rocker 4 raised via the supporting member 17. Accordingly, the pin 44 defines now the pivotal point of the rocker 4 such that the feeding roller 3 is lifted off. Because obviously the pressing bar 46 is lifted off, too, because the arms 13, 14 pivot around their pivotal point at the casing 1, the sheet metal web 43 can be freely inserted. The adjusting nut 22, which determines via the pin 21 the base position of the piston 20, is used for the adjusting of the height position of the supporting member 17, i.e. specifically of the oblong hole 16 thereof. It has been mentioned that during a pivoting of the rocker 4 the pin 15 moves in the oblong hole 16. If during the initial upwards movement of the rod 7 the roller 3 and thereafter the pressing bar 46 are lifted off the sheet metal web 43, the web lies completely free during a short time span, so that the arresting or locking, pins of the respective tools of the punching apparatus can center the sheet metal web 43 for the punching operation. Accordingly, the time span for the centering of the sheet metal web 43 by means of the locking pins may be adjusted by means of operating the adjusting nut 22.

Figures 6, 7:
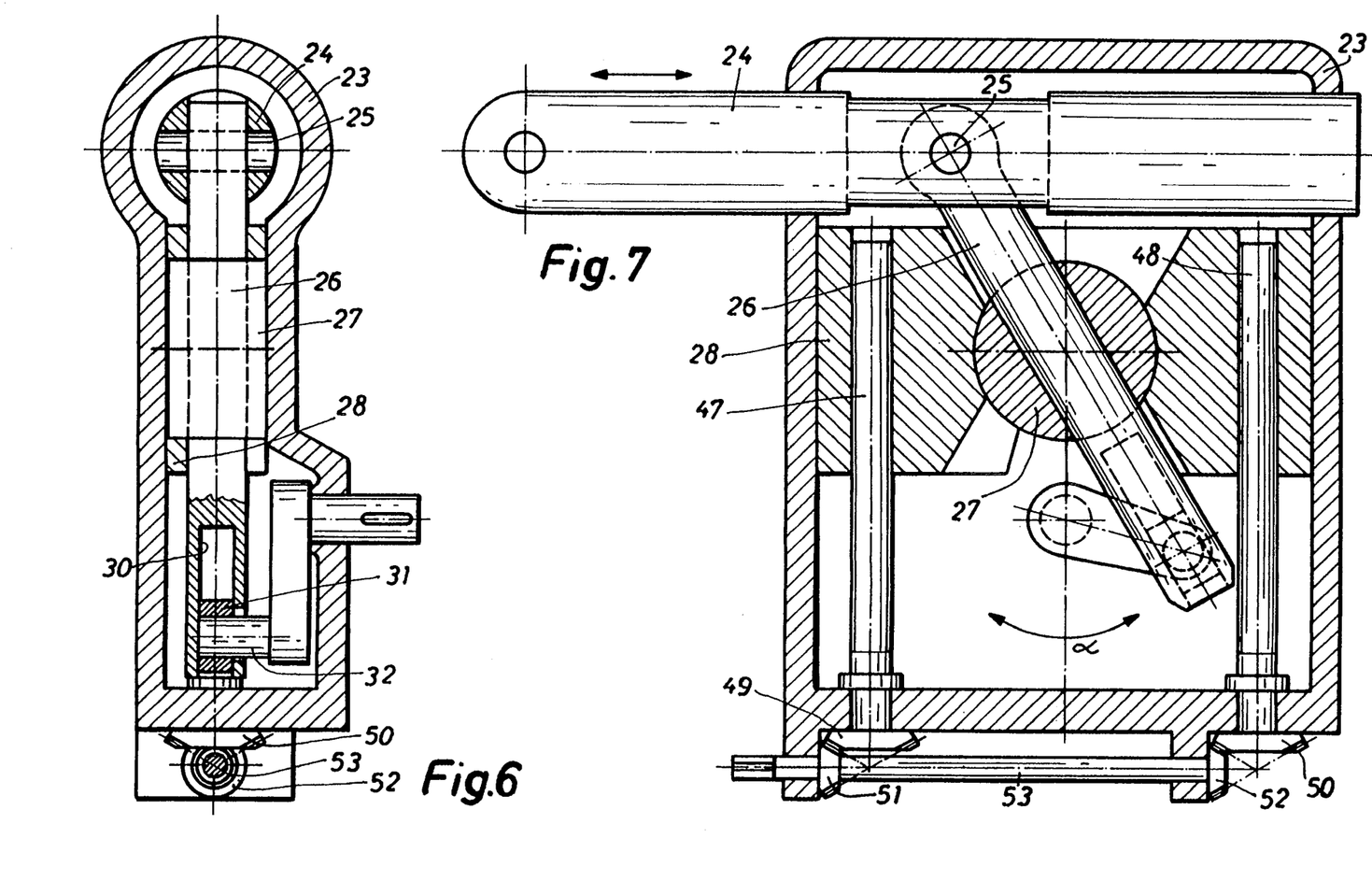
FIGS. 6 and 7 illustrate a further embodiment of an apparatus for an oscillating driving of at least one shaft.

FIGS. 6 and 7 illustrate a further embodiment of the apparatus for driving at least one oscillating shaft. The reference numerals used are identical to the reference numerals applied in FIGS. 4 and 5. Two threaded spindles 47 and 48 extend through the bearing pedestal 28 of this embodiment. These spindles are mounted at their lower ends to a respective bevel gear 49, 50, which bevel gears 49, 50 mesh each with a further bevel gear 51, 52, which further bevel gears are mounted on a common adjusting shaft. In comparison with the embodiment illustrated in FIGS. 4 and 5 it is obvious, that the narrow side of this embodiment is smaller and the broadside somewhat broader than the previous embodiment, whereby specifically the supporting of the bearing pedestal 21 by two threaded spindles causes no longer the danger of a tilting thereof, which would give rise to increased friction when adjusting the position of the pedestal.

According to still further embodiments of the apparatus provisions are made, by means of which the respective length of a feed caused by the oscillating movement of the feeding member, which length of the feed depends in the last instance on the pivot angle α (see FIGS. 5 and 7) can be increased, although the pivot angle α is kept at the same magnitude. Attention is now drawn to FIGS. 7-9, in which a part of FIG. 1 is illustrated on a somewhat increased scale.

FIG. 8 illustrates again the lever 26 having the slide body 31 inserted thereinto, which slide body 31 receives the pivot 32 of the crank 33. The shaft journal 54 of the pivot is rotatably supported in the shaft 34 of the oscillating feeding unit to be driven, here the lower feeding roller 2. A web 56 of a planet gear, which web supports a planet pinion 55, is located at the side of the crank arm 33 opposite that having the pivot 32. The planet pinion 55 rolls in an outer sun wheel 57 having an inner thread, which sun wheel 57 has the structure of a stationary gear wheel segment. The planet pinion 55 meshes on the other hand with an inner sun wheel 58, which is seated on the shaft 34 which is to be driven. It is now obvious, that by a corresponding selecting of the number of teeth the length of the feed produced by the feeding roller 2 can be increased in comparison with the length of the feed which can be achieved by a pivoting movement of the pivot 32 without any gear in between. The inner sun wheel 58 meshes with a further gear wheel 59 (which also could have the shape of merely a toothed wheel segment), which gear wheel 59 is mounted fixedly to the clutch 42 to rotate therewith, via which clutch 42 the upper feeding roller 3 is finally driven.

Figure 9:
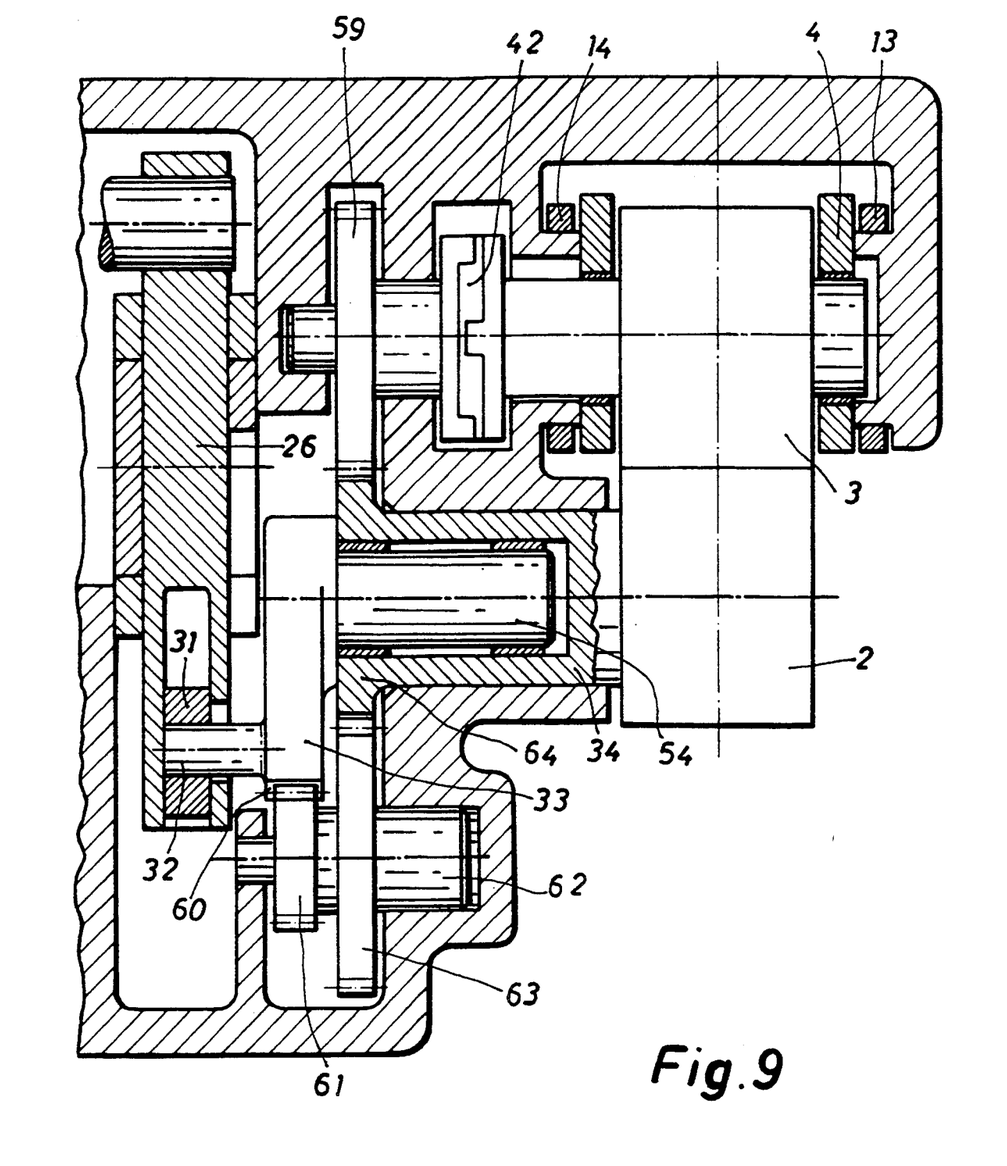

The crank 33 of the embodiment in accordance with FIG. 9 includes radial serrations 60 similar to a part of a spur gear. The shaft journal 54 of the crank 33 is again supported in the shaft 34 to be driven. The crank 33 meshes with its radial serrations 60 with a first gear wheel 61 which is seated on a shaft 62, on which shaft 62 a second gear wheel 63 is seated, which, however, has a larger number of teeth. This gear wheel 63 meshes with a gear wheel 64 mounted fixedly to the shaft 34 to be driven, which gear wheel 64 meshes in turn with the gear wheel (toothed segment) 59, which is connected to the clutch 42, via which clutch 42 the upper feeding roller 3 is oscillatingly driven. The two gear wheels 61 and 63 produce obviously a gear ratio, by means of which a length of feed is achieved, which is increased relative to the movement of the pivot 32.

Figure 8:
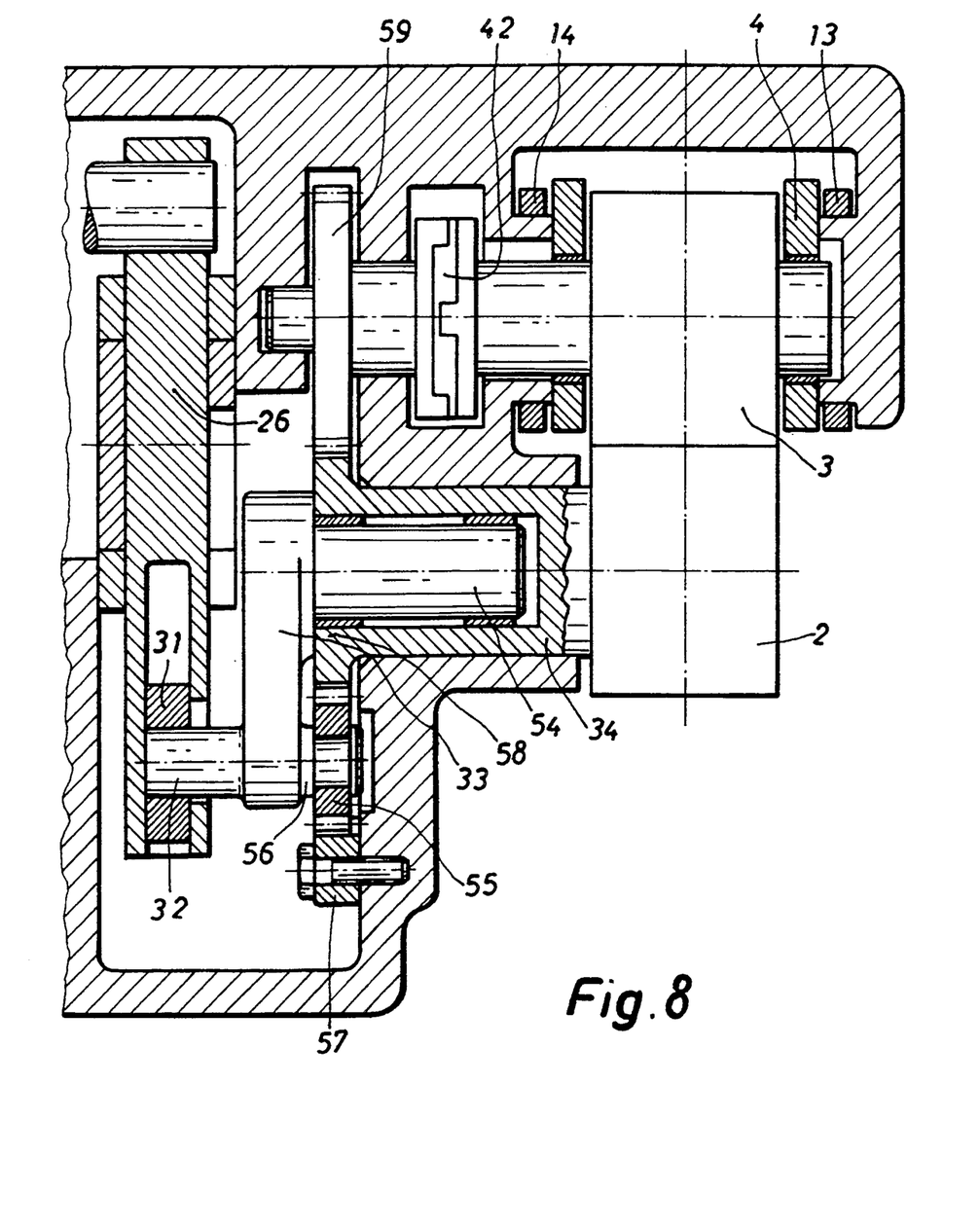
FIGS. 8 to 10 illustrate various embodiments, in which large lengths of feed are achieved with a design having a smaller angle of the pivoting movement of the lever.
Figure 10:
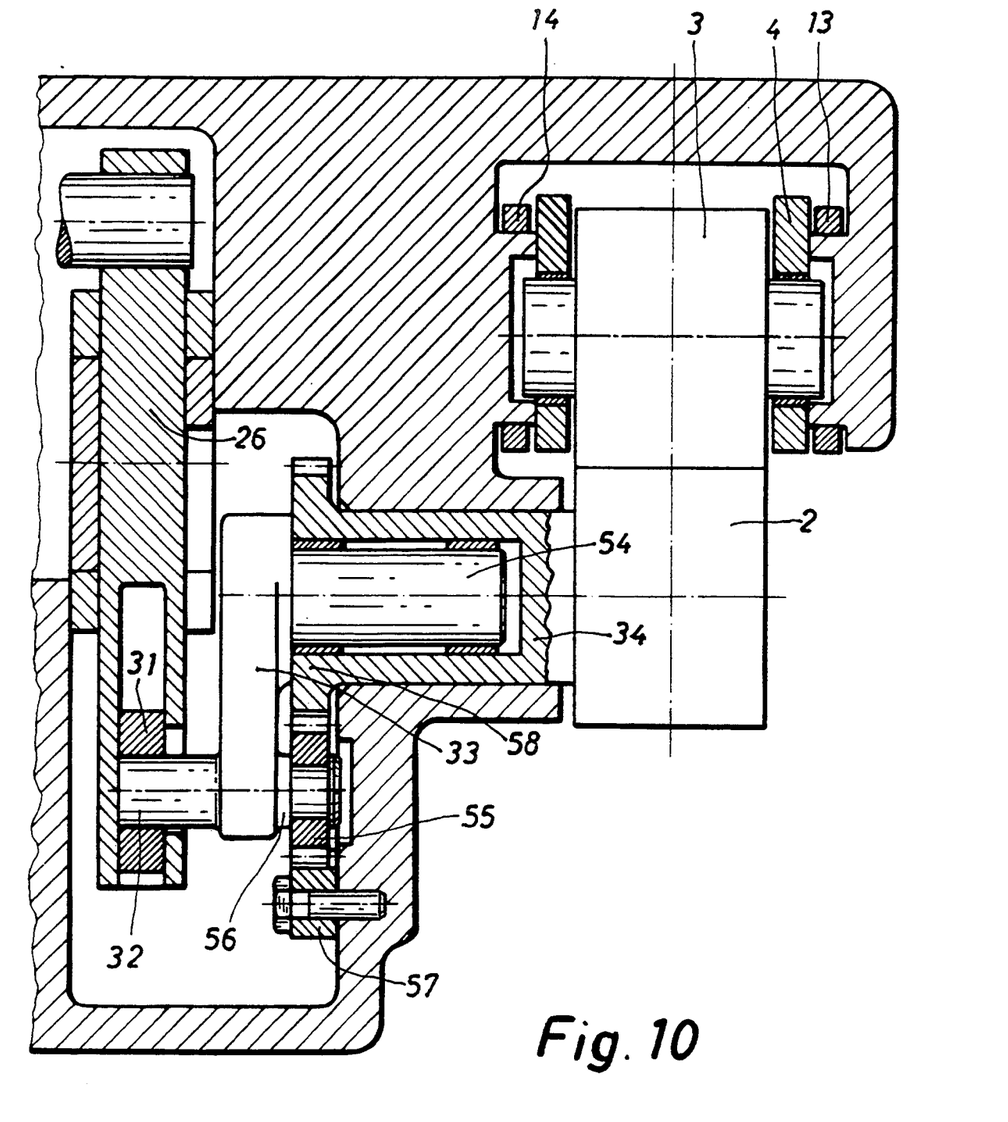

A further modification is illustrated in FIG. 10, which regarding the design of transmission corresponds to that of FIG. 8. In the embodiment of FIG. 10, however, the earlier gear wheel 59 with the clutch 42 is missing. Accordingly, only the lower feeding roller 2 is oscillatingly driven to operate as an oscillating feeding unit. The upper roller 3 acts here only as a freely rotating pressing roller which is pressed by the rocker 4 intermittingly, i.e. periodically, towards the lower feeding roller 2, i.e. onto the web-shaped workpiece located therebetween and being fed. Accordingly, the pressing roller is rotated merely by the movement of the workpiece being fed through the action of the lower feeding unit 2.

While there are shown and described present preferred embodiments of the invention, it is to be distinctly understood that the invention is not limited thereto, but may be otherwise variously embodied and practiced within the scope of the following claims.

I claim:

1. In an apparatus for intermittently feeding a web-shaped workpiece, the apparatus having feeding means for so feeding said workpiece, an improved drive apparatus for oscillating at least one shaft of said feeding means, the drive apparatus comprising:

a pivotable lever pivotable around a pivot axis, said pivotable lever having a longitudinal center axis;

a slide body guided slidably by said lever for travel axially therealong;

a crank having a pivot projecting from one side of said crank, said pivot being received in said slide body, and said crank being coupled to said shaft of said feeding means;

said pivotable lever including a hollow tubular portion having top and bottom walls and opposite side walls, said walls having inner surfaces forming guiding and sliding surfaces for said slide body, said slide body having side surfaces which are in slidable contact with the inner surfaces of said side walls, and top and bottom surfaces which are in slidable contact with the inner surfaces of said top and bottom walls, said top wall having a slot therein extending axially of said lever, said pivot of said crank passing through said slot and pivotably engaging said slide body;

drive means for reciprocating between two end positions coupled to said pivotable lever; and adjusting means for adjusting a distance between said pivot axis of said pivotable lever and an axis of said pivot of said crank for selecting at least an extent of said feeding of said feeding means.

2. The apparatus of claim 1, in which said drive means is coupled to one end of said pivotable lever and said sliding surfaces slidably guide said slide body at an opposite end of said pivotable lever, and said adjusting means comprises a drum-shaped guide member which slidably receives said pivotable lever to define said pivot axis of said pivotable lever, said guide member being rotatably supported in a bearing pedestal, and at least one threaded spindle which extends from a casing to said pedestal to adjust the position thereof relative to said casing and thereby the spacing between the pivot axis of the pivotable lever and the axis of the pivot of the crank, a geometrical center of said drum shaped guide member being located on said longitudinal center axis of said pivotable lever.

3. The apparatus of claim 2, wherein said pedestal has cylindrical surfaces supporting said drum shaped guide member and opposite flat surfaces slidably engaging said casing on opposite sides of said pivotable lever, said cylindrical surfaces of said pedestal being positioned in substantially coplanar alignment with said pivotable lever.

4. The apparatus of claim 2, comprising two threaded spindles extending through said bearing pedestal, and wherein the longitudinal center axis of said pivotable lever extends in a plane defined by center axes of said threaded spindles.

5. The apparatus of claim 1, in which said crank is rotatably journaled in said shaft of said feeding means, and further comprising a web rotatably supporting a planet pinion, said web and planet pinion projecting from a side of said crank located opposite said one side of said pivot of said crank, an outer sun-wheel segment fixed stationarily on a casing and having an inner toothing along which said planet pinion rollingly meshes, and an inner sun wheel having an outer toothing with which said planet pinion meshes, said inner sun wheel being mounted to said shaft of said feeding means.

6. The apparatus of claim 5, in which said drive means is coupled to one end of said pivotable lever and said sliding surfaces slidably guide said slide body at an opposite end of said pivotable lever, and said adjusting means comprises a drum-shaped guide member which slidably receives said pivotable lever to define said pivot axis of said pivotable lever, said guide member being rotatably supported in a bearing pedestal, and at least one threaded spindle which extends from a casing to said pedestal to adjust the position thereof relative to said casing and thereby the spacing between the pivot axis of the pivotable lever and the axis of the pivot of the crank, a geometrical center of said drum shaped guide member being located on said longitudinal center axis of said pivotable lever.

7. The apparatus of claim 6, and further comprising another said threaded spindle, and wherein the longitudinal center axis of said pivotable lever is in a plane defined by axes of said threaded spindles.

8. The apparatus of claim 1, in which said crank is rotatably journaled in said shaft of said feeding means, and further comprising a web rotatably supporting a planet pinion, said web and planet pinion projecting from a side of said crank located opposite said one side of said pivot of said crank, an outer sun-wheel segment fixed stationarily on a casing and having an inner toothing along which said planet pinion rollingly meshes, and an inner sun wheel having an outer toothing with which said planet pinion meshes, said inner sun wheel being mounted to said shaft of said feeding means, said inner sun wheel meshing with a further gear wheel that is mounted on another shaft of said feeding means for also oscillating said other shaft.

9. The apparatus of claim 8, in which said drive means is coupled to one end of said pivotable lever and said sliding surfaces slidably guide said slide body at an opposite end of said pivotable lever, and said adjusting means comprises a drum-shaped guide member which receives said pivotable lever to define said pivot axis of said pivotable lever, said guide member being rotatably supported in a bearing pedestal, and at least one threaded spindle which extends from a casing to said pedestal to adjust the position thereof relative to said casing and thereby the spacing between the pivot axis of the pivotable lever and the axis of the pivot of the crank, a geometrical center of said drum shaped guide member being located on said longitudinal center axis of said pivotable lever.

10. The apparatus of claim 9, and further comprising another said threaded spindle, and wherein the longitudinal center axis of said pivotable lever is in a plane defined by axes of said threaded spindles.

11. The apparatus of claim 1, in which said crank is rotatably journaled in said shaft of said feeding means and has radial serrations, and further comprising first and second gear wheels having teeth and being mounted on a common rotatable shaft, said radial serrations meshing with said first gear wheel and said second gear wheel having a larger number of said teeth than said first gear wheel, said teeth of said second gear wheel meshing with a third gear wheel that is mounted to said shaft of said feeding means.

12. The apparatus of claim 11, and wherein said third gear wheel meshes with a further gear wheel on another shaft of said driving means.

13. The apparatus of claim 11, in which said drive means is coupled to one end of said pivotable lever and said sliding surfaces slidably guide said slide body at an opposite end of said pivotable lever, and said adjusting means comprises a drum-shaped guide member which slidably receives said pivotable lever to define said pivot axis of said pivotable lever, said guide member being rotatably supported in a bearing pedestal and at least one threaded spindle which extends from a casing to said pedestal to adjust the position thereof relative to said casing and thereby the spacing between the pivot axis of the pivotable lever and the axis of the pivot of the crank, a geometrical center of said drum shaped guide member being located on said longitudinal center axis of said pivotable lever.

14. The apparatus of claim 13, and further comprising another said threaded spindle, and wherein the longitudinal center axis of said pivotable lever is in a plane defined by axes of said threaded spindles.

15. The apparatus of claim 1, wherein said slide ring and said tubular portions have corresponding rectangular sections.

* * * * *